United States Patent [19]
Ide

[11] Patent Number: 5,228,741
[45] Date of Patent: Jul. 20, 1993

[54] VEHICLE REAR BODY STRUCTURE

[75] Inventor: Yoshikazu Ide, Hiroshima, Japan

[73] Assignee: Mazda Motor Corporation, Hiroshima, Japan

[21] Appl. No.: 763,421

[22] Filed: Sep. 20, 1991

[30] Foreign Application Priority Data

Sep. 20, 1990 [JP] Japan .................. 2-248872

[51] Int. Cl.$^5$ .................................. B62D 25/08
[52] U.S. Cl. .................. 296/188; 296/189; 296/195; 296/203
[58] Field of Search .............. 296/188, 195, 203, 205, 296/189

[56] References Cited

U.S. PATENT DOCUMENTS

| | | | |
|---|---|---|---|
| 2,177,896 | 10/1939 | Lee | 296/205 |
| 2,389,907 | 11/1945 | Helmuth | 296/203 |
| 4,875,733 | 10/1989 | Chado | 296/195 |
| 4,973,103 | 11/1990 | Imajyo | 296/195 |
| 5,094,313 | 3/1992 | Mauws | 296/205 X |

FOREIGN PATENT DOCUMENTS

| | | | |
|---|---|---|---|
| 60-131377 | 7/1985 | Japan . | |
| 30467 | 2/1986 | Japan | 296/188 |
| 169375 | 7/1986 | Japan | 296/195 |
| 156181 | 6/1989 | Japan | 296/203 |
| 297905 | 10/1928 | United Kingdom | 296/189 |

Primary Examiner—Dennis H. Pedder
Attorney, Agent, or Firm—Fish & Richardson

[57] ABSTRACT

A vehicle rear body structure with first and second frame reinforcement members connected to a rear belt line reinforcement and to a rear pillar behind a door is disclosed. When an end-to-end vehicle collision occurs, impact energy is dispersed through the first and second frame reinforcement members so as to prevent bending of the rear pillar obstructing the opening of the vehicle door. Passenger escape is facilitated.

7 Claims, 4 Drawing Sheets

VEHICLE REAR BODY STRUCTURE

FIELD OF THE INVENTION

The present invention relates to the body structure of an automotive vehicle, particularly to an improvement to the rear body structure of an automotive vehicle.

BACKGROUND OF THE INVENTION

In the prior art, a vehicle body structure having high stiffness has been proposed. U.S. Pat. No. 4,875,733 discloses a vehicle rear body structure having a belt line reinforcement extending horizontally toward the rear portion of the body, to provide a highly stiff vehicle body. A rear end of the belt line reinforcement is connected to a rear panel of the vehicle body, while a front end of the belt line reinforcement is connected to an intermediate portion of a vertical rear pillar. When an end-to-end vehicle collision occurs, the impact energy is consequently transmitted to the rear pillar.

Japanese laid-open utility model publication No. 60-131377 discloses a rear body structure having the belt line reinforcement connected to an intermediate portion of the rear pillar, and a frame reinforcement which is connected to an upper end of the rear pillar and to a middle portion of the belt line reinforcement at its respective ends. However, in the vehicle rear body structures in U.S. Pat. No. 4,875,733 and Japanese laid-open utility model publication No. 60-131377, when an end-to-end vehicle collision occurs, the impact energy bears on the connecting portion between the belt line reinforcement and the rear pillar. As a result, the rear pillar is easily bent forward at the portion connected with the belt line reinforcement. Such a bent rear pillar may prevent the door from opening, no matter how much effort the passenger may apply to it.

SUMMARY OF THE INVENTION

To overcome these structural deficiencies resulting in an obstructed door after collision, the invention provides a vehicle rear body structure having a roof side rail disposed at an upper end of a vehicle body and extending longitudinally in the vehicle body, and a side sill disposed at a lower end of the vehicle body and extending longitudinally in the vehicle body. A first pillar extends in a vertical direction of the vehicle body and is connected at its upper end to the roof side rail and at its lower end to the side sill. A second pillar is disposed behind the first pillar, and extends in a vertical direction of vehicle body and is connected at its upper end to the roof side rail and at its lower end to the side sill. The second pillar together with the roof side rail, the side sill, and the first pillar form an opening for installing a vehicle door.

The invention provides a belt line reinforcement disposed at an intermediate vertical portion of the second pillar and extending horizontally from a predetermined distance behind the second pillar to a rear end of the vehicle body. A first frame reinforcement member extends upward from the front end portion of the belt line reinforcement and is connected to the upper end of the second pillar, while a second frame reinforcement member extends downward from the belt line reinforcement and is connected to the lower end of the second pillar or to the side sill. Collision energy absorbed by the belt line reinforcement is therefore effectively dispersed through the first and second frame reinforcement members so as to avoid bending of the second pillar obstructing the opening of the door after an end-to-end vehicle collision.

DETAILED DESCRIPTION OF THE INVENTION

Figure 1:
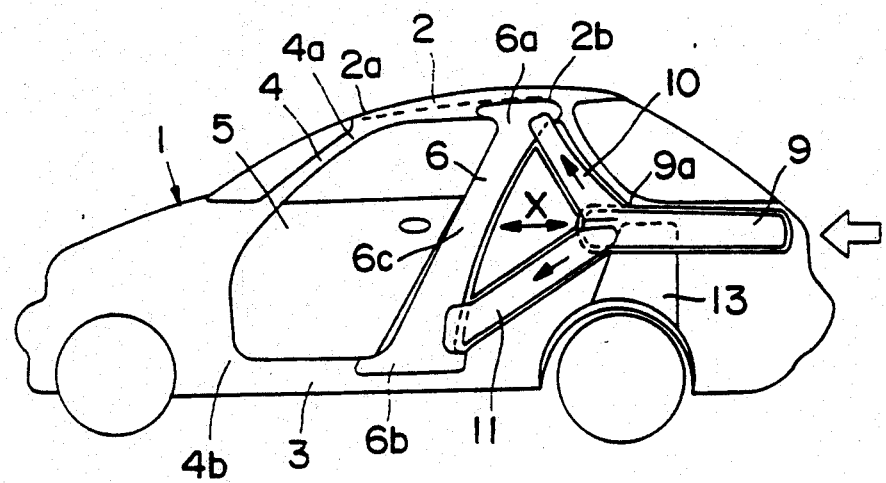
FIG. 1 is a schematic view of an automotive vehicle showing a first embodiment of the invention.
Figure 2:
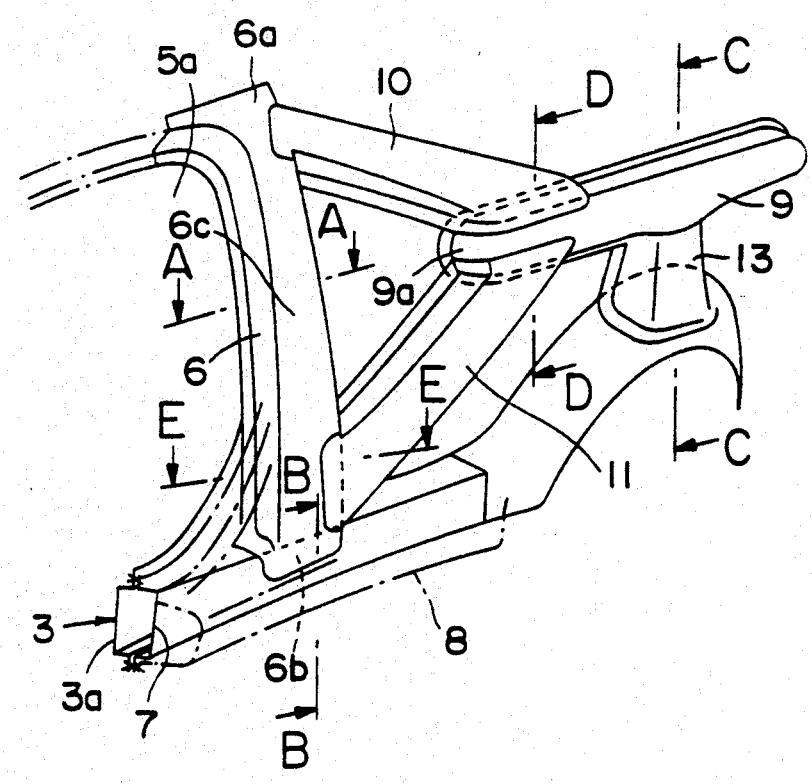
FIG. 2 is a partly exploded view showing the rear body structure of the vehicle of FIG. 1.
Figure 3:
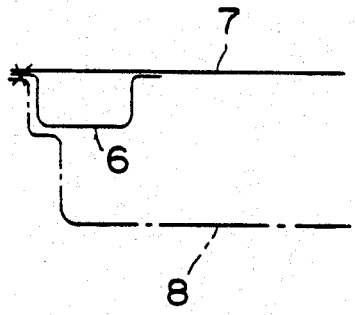
FIG. 3 is a sectional view taken along line A—A in FIG. 2.
Figure 4:
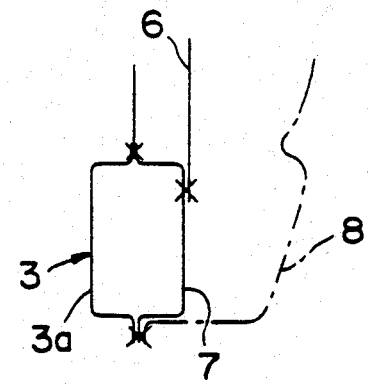
FIG. 4 is a sectional view taken along line B—B in FIG. 2.

A first embodiment of the present invention is shown in FIGS. 1 to 7. As shown in FIGS. 1 and 2, roof side rail 2 is disposed at an upper end of vehicle body 1, and extends in longitudinal direction of the vehicle body 1. Side sill 3 having a closed section is disposed at the lower portion of the vehicle body 1, and extends in a longitudinal direction of the lower vehicle body. Front pillar 4 is disposed at front end 2a of the roof side rail 2, and extends vertically. One end 4a of the front pillar 4 is connected to the front end 2a of the roof side rail 2, while the other end 4b of the front pillar 4 is connected to the side sill 3. Rear pillar 6 is disposed behind side door 5. Upper end 6a of the rear pillar 6 is connected to roof side rail 2 at the rear end 2b, and lower end 6b of the rear pillar is connected to the side sill 3. The side sill 3 as shown in FIG. 2 has inner panel 3a and outer panel 7 which is part of a rear quarter panel. Outer panel 7 is covered with rear fender 8, as shown in FIGS. 3 and 4. As a result, opening 5a for installing the door 5 is formed by the roof side rail 2, the side sill 3, the front pillar 4, the rear pillar 6.

Belt line reinforcement 9 is disposed at about the middle portion of the rear pillar 6, and extends horizontally backward from a predetermined distance X behind the rear pillar 6 to the rear end of the vehicle body 1. First frame reinforcement member 10 is disposed at front end 9a of the belt line reinforcement 9, and extends upward and forward from the belt line reinforcement 9. The first frame reinforcement member 10 is constructed as a single frame. One end of the first frame reinforcement member 10 is connected to the front end 9a of the belt line reinforcement 9, and the other end of the first frame reinforcement member 10 is connected to the upper end 6a of the rear pillar 6 by welding, etc., respectively.

Figure 5:
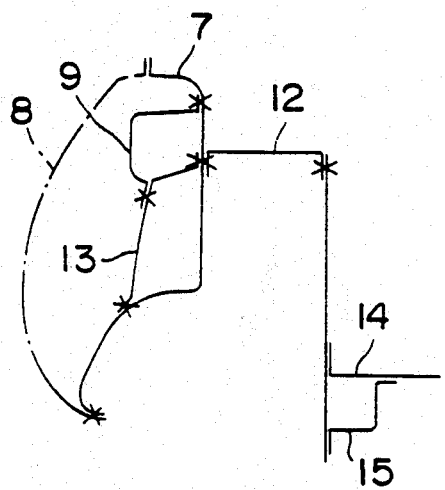
FIG. 5 is a sectional view taken along line C—C in FIG. 2.
Figure 6:
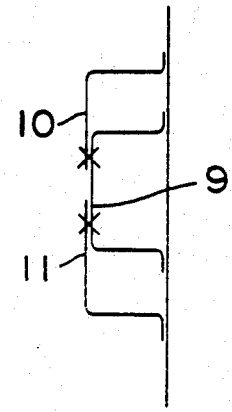
FIG. 6 is a sectional view taken along line D—D in FIG. 2.
Figure 7:
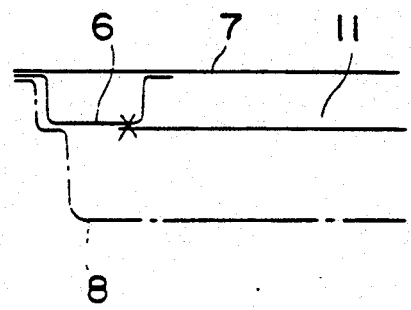
FIG. 7 is a sectional view taken along line E—E in FIG. 2.

Second frame reinforcement member 11 is disposed at the front end 9a of the belt line reinforcement 9, and extends downward and forward from the belt line reinforcement 9. The second frame reinforcement member 11 is also constructed as a single frame. One end of the second frame reinforcement member 11 is connected to the front end 9a of the belt line reinforcement 9, and the other end of the second frame reinforcement member 11 is connected to lower end 6b of the rear pillar 6 by welding, etc. As shown in FIG. 5, the belt line reinforcement 9 is connected by welding, etc., to the side of an outer panel 7 which is provided between rear fender 8 and suspension tower 12. The lower portion of the belt line reinforcement 9 is connected to a suspension casing 13. Floor panel 14 is provided, as is rear side frame 15.

In the first embodiment shown in FIGS. 1 to 7, when an end-to-end vehicle collision occurs, the impact energy is transmitted from the belt line reinforcement 9 to the first frame reinforcement member 10 and second frame reinforcement member 11, and then to the upper end 6a and the lower end 6b of the rear pillar 6. As a result, because impact energy is effectively dispersed and heavy loads do not bear on the intermediate portion 6c of the rear pillar 6, bending of that portion of the rear pillar 6 is consequently avoided, and it is still possible to open side door 5. Therefore, the rear vehicle body of the invention makes passenger escape possible even when an end-to-end collision occurs.

Figure 8:
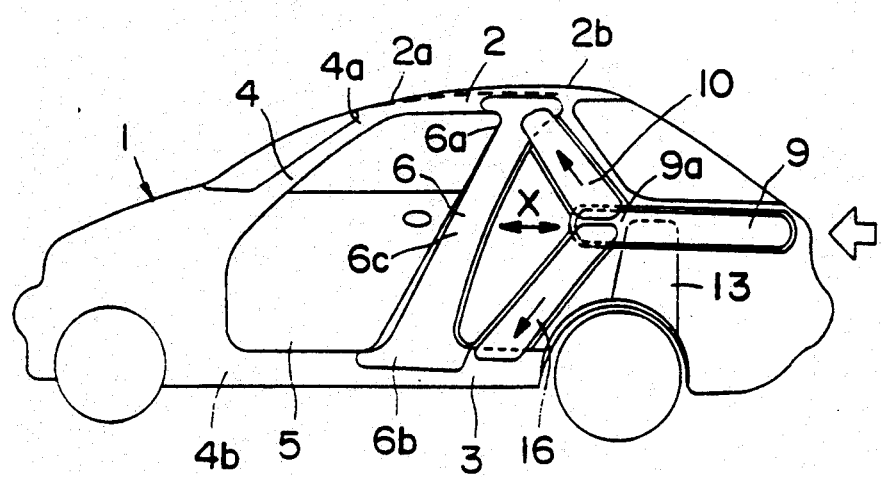
FIG. 8 is a schematic view of an automotive vehicle showing a second embodiment of the invention.

A second embodiment of the invention is shown in FIG. 8. In this embodiment, the first frame reinforcement member 10 is connected to the front end 9a of the belt line reinforcement 9 and to the upper end 6a of the rear pillar 6, as in the first embodiment. Frame reinforcement 16 constructed as a part of the second frame reinforcement member is connected to the front end 9a of the belt line reinforcement 9 and to the side sill 3, near the rear pillar 6. That is, in this second embodiment, the second frame reinforcement member is constituted by frame reinforcement 16 connected to side sill 3, instead of lower end 6b of rear pillar 6. The second embodiment works similarly to the first to effectively disperse impact energy and prevent bending of the intermediate portion 6c of the rear pillar 6, and hence to keep side door 5 from being obstructed after an end-to-end vehicle collision.

Figure 9:
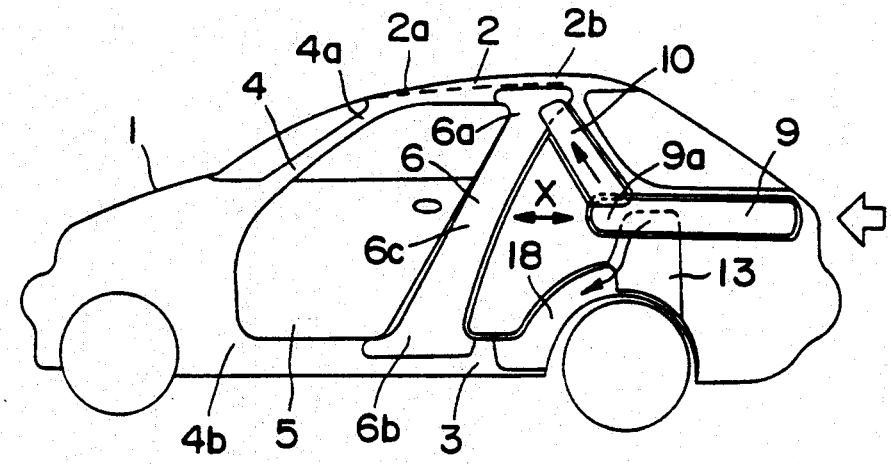
FIG. 9 is a schematic view of an automotive vehicle showing a third embodiment of the invention.
Figure 10:
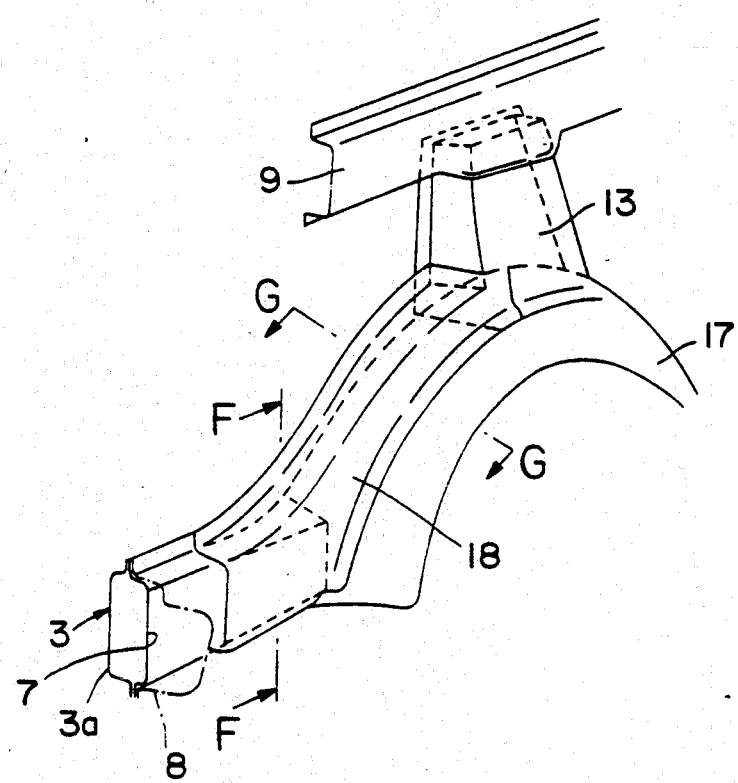
FIG. 10 is a partly exploded view showing the rear body structure of the vehicle of FIG. 9.
Figure 11:
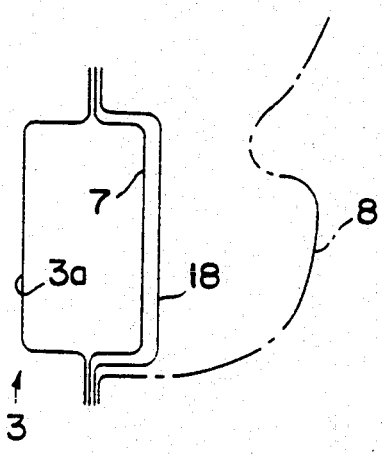
FIG. 11 is a sectional view taken along line F—F in FIG. 10.

A third embodiment of the invention is shown in FIGS. 9 to 11. In this embodiment, the first frame reinforcement member 10 is connected to the front end 9a of the belt line reinforcement 9 and to the upper end 6a of the rear pillar 6, as in the first and second embodiments. Suspension casing 13 constructed as part of the second frame reinforcement member is connected to frame reinforcement 18 which extends along wheel house 17, and is connected to the side sill 3 at the front end frame reinforcement 18. That is, in this third embodiment the second frame reinforcement member is constituted by the suspension casing 13, frame reinforcement 18, and the side sill 3. As shown in FIGS. 10 to 11, the wheel house 17 is connected to the lower end of the suspension casing 13 which is located at the lower of the belt line reinforcement by welding, etc. The wheel house 17 extends toward the side sill 3, overlapping the outer panel 7 which is disposed adjacent to the rear fender 8. As shown in FIG. 11, the front end of the frame reinforcement 18 forms a structure with side sill 3 and the outer panel 7 which has a closed cross section.

The third embodiment prevents bending of the intermediate portion 6c of the rear pillar 6 during an end-to-end collision, similarly to the first and second. In particular, because frame reinforcement 18 which overlaps the outer panel 7 and the side sill 3 forms a structure with the outer panel 7 and the side sill 3 having a closed cross section, the vehicle body structure can be highly stiff.

Figure 12:
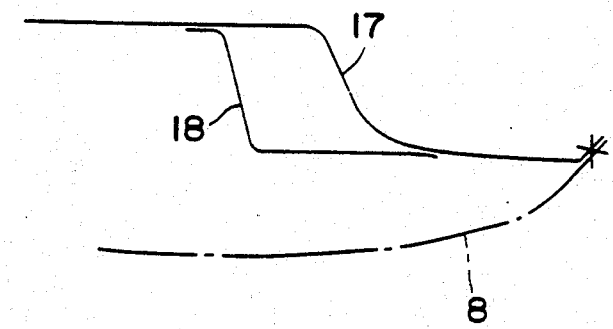
FIG. 12 is a sectional view taken along line G—G in FIG. 10.

A fourth embodiment of the invention is shown in FIG. 12, in which frame reinforcement 18 is formed inside of wheel house 17 and connected at recessed and forward portions of the wheel house 17, forming a roughly rectangular closed section.

These reinforcement structures of the invention effectively disperse impact energy so that and heavy loads do not bear on the intermediate portion 6c of the rear pillar 6. Bending of that portion of the rear pillar 6 is avoided, so it is still possible for a passenger to open side door 5 after an end-to-end collision.

From the above, it will be seen that variations of the vehicle rear body structure of the invention may be made by persons skilled in the art, without departing from the scope and spirit of the following claims.

I claim:

1. A vehicle rear body structure, comprising:
   a roof side rail disposed at an upper end of a vehicle body and extending longitudinally in the vehicle body,
   a side sill disposed at a lower end of the vehicle body and extending longitudinally in the vehicle body,
   a first pillar connected to an upper end to the roof side rail and at a lower end to the side sill,
   a second pillar disposed behind the first pillar and connected at an upper end to the roof side rail and at a lower end to the side sill, the second pillar together with the roof side rail, the side sill, and the first pillar forming an opening for a door,
   a belt line reinforcement having a longitudinal axis intersecting the second pillar at an intermediate portion thereof and a forward end spaced rearwardly of the second pillar, said belt line reinforcement extending horizontally to a rear end of the vehicle body with no structural member extending between the forward end and the second pillar along said longitudinal axis,
   a first frame reinforcement member extending upward from the forward end of the belt line reinforcement and extending to the upper end of the second pillar, and
   a second frame reinforcement member extending downward from the forward end of the belt line reinforcement and extending to the lower end of the second pillar,
   wherein the belt line reinforcement, the first frame reinforcement member and the second frame reinforcement member are arranged so that collision energy absorbed by said belt line reinforcement is dispersed through said first and second frame reinforcement members so as to avoid bending of said second pillar obstructing the opening of said door resulting from said collision.

2. A rear vehicle body structure in accordance with claim 1, wherein the first and second frame reinforcement members each comprise a single frame connecting the belt line reinforcement and the second pillar.

3. A vehicle rear body structure in accordance with claim 1, wherein the first frame reinforcement member extends linearly from the forward end of the belt line reinforcement to the upper end of the second pillar, and the second frame reinforcement member extends linearly from the forward end of the belt line reinforcement to the lower end of the second pillar.

4. A vehicle rear body structure in accordance with claim 1, wherein the belt line reinforcement, the first frame reinforcement member an the second frame reinforcement member form a Y-shaped figure.

5. A vehicle rear body structure, comprising:
a roof side rail disposed at an upper end of a vehicle body and extending longitudinally in the vehicle body,
a side sill disposed at a lower end of the vehicle body and extending longitudinally in the vehicle body,
a first pillar connected at an upper end to the roof side rail and at a lower end to the side sill,
a second pillar disposed behind the first pillar and connected at an upper end to the roof side rail and at a lower end to the side sill, the second pillar together with the roof side rail, the side sill, and the first pillar forming an opening for a door,
a belt line reinforcement having a longitudinal axis intersecting the second pillar at an intermediate portion thereof and a forward end spaced rearwardly of the second pillar, said belt line reinforcement extending horizontally to a rear end of the vehicle body with no structural member extending between the forward end and the second pillar along said longitudinal axis,
a first frame reinforcement member extending upward from the forward end of the belt line reinforcement and extending to the upper end of the second pillar, and
a second frame reinforcement member extending downward from the forward end of the belt line reinforcement and extending to the side sill near the second pillar,
wherein the belt line reinforcement, the first frame reinforcement member and the second frame reinforcement member are arranged so that collision energy absorbed by said belt line reinforcement is dispersed through said first frame reinforcement member and said second frame reinforcement member so as to avoid bending of said second pillar obstructing the opening of said door resulting from said collision.

6. A vehicle rear body structure, comprising:
a roof side rail disposed at an upper end of a vehicle body and extending longitudinally in the vehicle body,
a side sill disposed at a lower end of the vehicle body and extending longitudinally in the vehicle body,
a first pillar connected at an upper end to the roof side rail and at a lower end to the side sill,
a second pillar disposed behind the first pillar and connected at an upper end to the roof side rail and at a lower end to the side sill, the second pillar together with the roof side rail, the side sill, and the first pillar forming an opening for a door,
a belt line reinforcement having a longitudinal axis intersecting the second pillar at an intermediate portion thereof and a forward end spaced rearwardly of the second pillar, said belt line reinforcement extending horizontally to a rear end of the vehicle body with no structural member extending between the forward end and the second pillar along said longitudinal axis,
a first frame reinforcement member extending upward from the forward end of the belt line reinforcement and extending to the upper end of the second pillar,
a second frame reinforcement member comprising a first frame extending downward from the belt line reinforcement and a second frame extending forward from a lower end portion of the first frame and extending to the side sill,
wherein the belt line reinforcement, the first frame reinforcement member and the second frame reinforcement member are arranged so that collision energy absorbed by said belt line reinforcement is dispersed through said first frame reinforcement member and said second frame reinforcement member so as to avoid bending of said second pillar obstructing the opening of said door resulting from said collision.

7. A vehicle rear body structure in accordance with claim 6, wherein the second frame forms a closed section with a wheel house member.

* * * * *